United States Patent [19]

Kawamura

[11] Patent Number: 5,023,626

[45] Date of Patent: Jun. 11, 1991

[54] PRINTER CAPABLE OF TEMPERATURE COMPENSATION OF THE OPTICAL DENSITY OF A PRINTED IMAGE AFTER A COMPLETE IMAGE IS PRINTED

[75] Inventor: Hideaki Kawamura, Kawasaki, Japan

[73] Assignee: Canon Kabushiki Kaisha, Tokyo, Japan

[21] Appl. No.: 226,081

[22] Filed: Jul. 29, 1988

[30] Foreign Application Priority Data

Aug. 7, 1987 [JP] Japan ............................... 62-197960

[51] Int. Cl.[5] ........................ G01D 9/00; G01D 15/10; B41J 2/315; B41J 2/01

[52] U.S. Cl. .......................... 346/33 TP; 346/76 PH; 346/140 R; 400/120

[58] Field of Search ....... 346/33 TP, 76 PH, 140 PD; 400/120 PH

[56] References Cited

U.S. PATENT DOCUMENTS 4,479,132 10/1984 Iwakura ........................ 346/76 PH
4,591,876 5/1986 Nozaki et al. .................. 346/76 PH

FOREIGN PATENT DOCUMENTS 0173961 8/1986 Japan ............................. 346/76 PH

*Primary Examiner*—Benjamin R. Fuller
*Assistant Examiner*—Huan Tran
*Attorney, Agent, or Firm*—Fitzpatrick, Cella, Harper & Scinto

[57] ABSTRACT

A printer for recording an image on a recording medium comprises a recording head for recording an image on a recording medium, a thermocouple for detecting a temperature, a control circuit for controlling the recording head in accordance with a detection result of the thermocouple, recognizing circuit for a recognizing an end of an image and an operating circuit for operating the control circuit in accordance with the end recognition of the recognizing circuit.

42 Claims, 3 Drawing Sheets

PRINTER CAPABLE OF TEMPERATURE COMPENSATION OF THE OPTICAL DENSITY OF A PRINTED IMAGE AFTER A COMPLETE IMAGE IS PRINTED

BACKGROUND OF THE INVENTION

1. Field of the Invention

The present invention relates to a printer for recording an image on a recording medium and, more particularly, to a printer capable of maintaining a density of a recorded image constant.

2. Related Background Art

It is well known that in a printer for printing an image, a recording density is changed by an environmental temperature change or a temperature change in a recording head. Therefore, an image printer comprising a temperature compensating circuit for compensating the temperature change to maintain the recording density constant has been proposed.

However, when a temperature changes and the compensating circuit operates during image recording the density of the image differs before and after operation of the circuit. Therefore, the image obtained may be unnatural. Especially in a color printer, a color tone may be changed and degrade image quality.

SUMMARY OF THE INVENTION

It is, therefore, an object of the present invention to provide a printer capable of forming an image with a constant density on a recording medium.

It is another object of the present invention to provide a printer capable of preventing a temperature compensation characteristic change during recording of one image.

It is still another object of the present invention to provide a printer capable of recording an image with a uniform density on a continuous recording medium (e.g., continuous paper).

It is still another object of the present invention to provide a continuous paper printer having a temperature compensating circuit.

DETAILED DESCRIPTION OF THE PREFERRED EMBODIMENT

An embodiment to be described below is a printer comprising a temperature detecting means, an adjusting means for adjusting a print density in accordance with a detection output from the detecting means, a recognizing means for recognizing an end of an image in accordance with a command from an external equipment, and a control means for operating the adjusting means in accordance with an output from the recognizing means.

Figure 1:
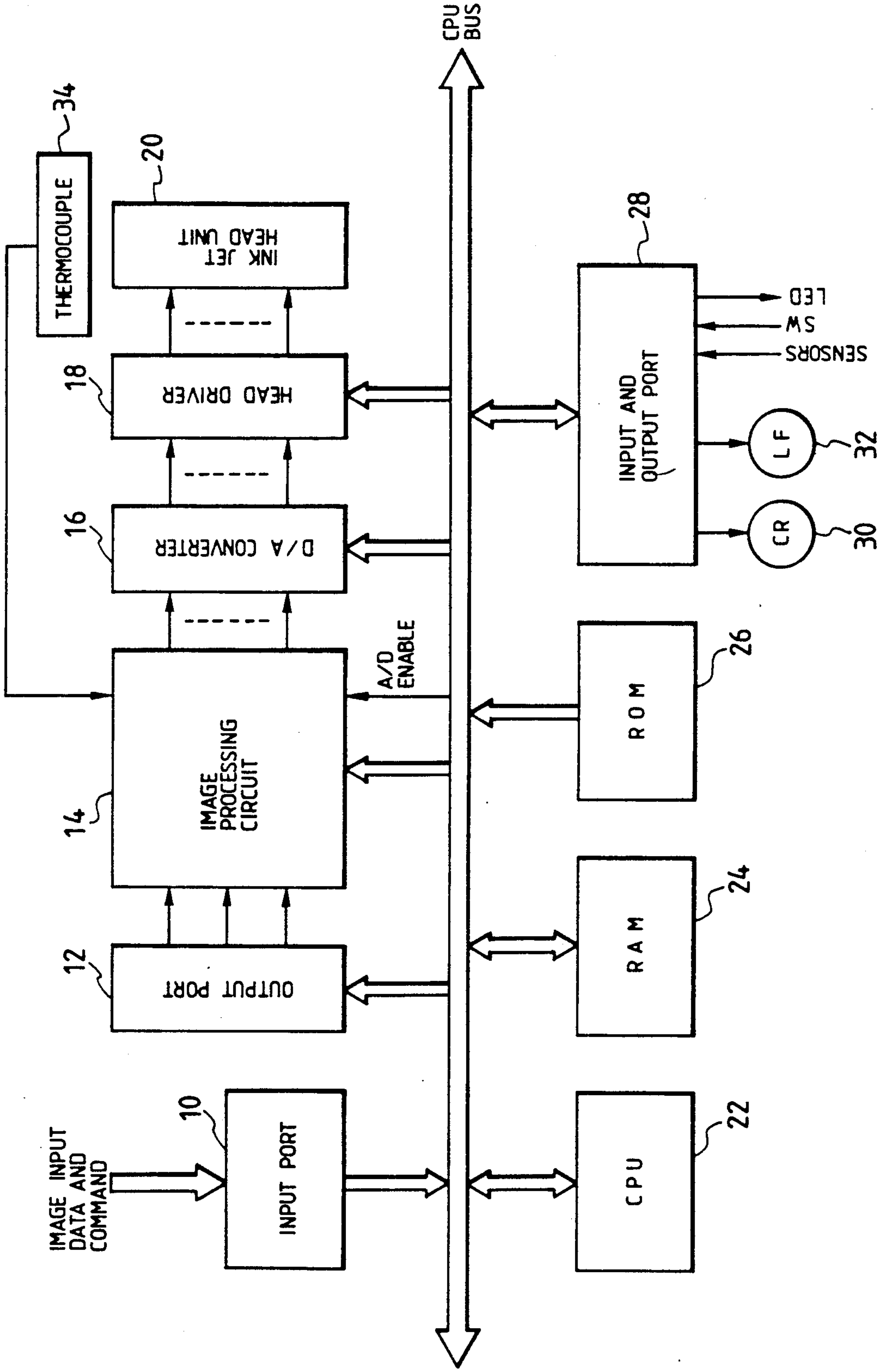
FIG. 1 is an overall block diagram of a printer according to an embodiment of the present invention.

FIG. 1 is an overall block diagram of a full color printer.

An operation of the printer will be described below in accordance with a data flow. First, image input data and command from an external equipment (e.g., an image reader or a host computer such as a personal computer or a micro computer are stored in a RAM 24 through an input port 10. Note that an input means need not be the external equipment but may be arranged integrally with the printer.

The input port 10 is a known standard interface which is a system according to Centronics when a parallel signal is used and is a system according to RS-232C when a serial signal is used. In this case, the image data may be input either by R, G, and B (Red, Green, and Blue) or by C, M, and Y (Cyan, Magenta and Yellow). In either case, however, when data of one line is input and a print command is received, printing of one line is started. A carriage motor (CR) 30 starts main scanning, and a position of a head 20 is detected by various sensors (not shown). Printing data stored in the RAM 24 is supplied to an image processing circuit 14 through an output port 12 in synchronism with a timing from each sensor. The data is subjected to removal processing of an asymmetric color component of an ink or UCR processing and then supplied to a D/A converter 16.

An output voltage of the D/A converter 16 is converted into a proper voltage pulse by a head driver 18 and applied to the head 20. In this embodiment, since a piezo ink jet head (for ejecting an ink droplet to record an image on a recording medium) is used as a recording means, harmonization can be expressed in accordance with a magnitude of the voltage, and therefore full color printing can be performed in a combination of the harmonization and C, M, Y, and BK.

A CPU 22 is connected to a ROM 26 which stores control programs, a line feed motor (LF) 32 for feeding continuous paper in a subscanning direction, and various switches (SW), sensors, LEDs, and the like through an input and output port 28.

Figure 2:
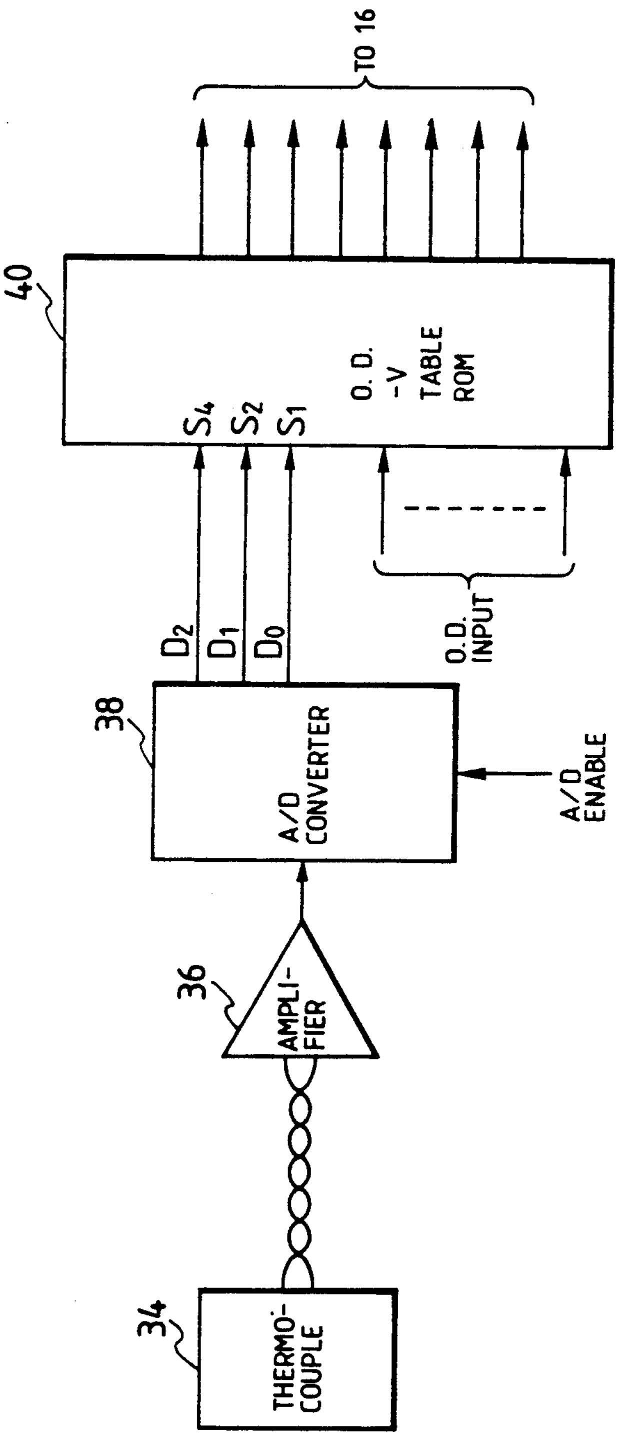
FIG. 2 is a block diagram of a temperature compensating circuit in an image processing circuit 14 in FIG. 1.

The image processing circuit 14 incorporates a temperature compensating circuit shown in FIG. 2.

When an ink jet head or the like is used, the viscosity of an ink changes as a temperature changes, and therefore the amount of ink ejected changes even when an application voltage remains the same. Therefore, a recorded O.D. (optical density) value also changes.

Similarly, when a thermal head is used, the recorded 0.D value changes when a temperature of the head increases.

Causes of the temperature change are a change in an operation environmental temperature, internal heat generation caused by long time driving, heat generation of the head itself, and the like. Therefore, it is difficult to maintain the temperature constant.

However, it is not preferred that the recording density differs in accordance with the temperature change, and a coloring failure may occur in the ink jet system. For these reasons, some countermeasure must be taken.

An operation of the embodiment of the present invention will be described below. That is, a thermocouple 34 is embedded in the head unit 20, and an amplifier 36 and an A/D converter 38 output codes corresponding to a temperature change to $D_0$ to $D_2$. When an A/D enable terminal of the A/D converter 38 is active, an output corresponding to an input is sequentially updated. However, when the terminal is inactive, the last state is held. An 0.D.-V table ROM 40 receives an 0.D. value to be printed and stores a drive voltage value of each head to be output to the D/A converter 16. Several optical density to drive voltage values are stored to be suitably used in the respective temperature ranges represented by $D_0$ to $D_2$. Each such O.D.-V table may correspond to any suitable temperature range, a typical breakdown being shown in the following table:

TABLE 1

| $D_2$ | $D_1$ | $D_0$ | Temperature Range |
|---|---|---|---|
| 0 | 0 | 0 | Not more than 10° C. |
| 0 | 0 | 1 | Not less than 10° C. and not more than 15° C. |
| 0 | 1 | 0 | Not less than 15° C. and not more than 20° C. |
| 0 | ·1 | 1 | Not less than 20° C. and not more than 25° C. |
| 1 | 0 | 1 | Not less than 25° C. and not more than 30° C. |
| 1 | 0 | 0 | Not less than 30° C. and not more than 35° C. |
| 1 | 1 | 0 | Not less than 35° C. and not more than 40° C. |
| 1 | 1 | 1 | Not less than 40° C.; |

In this case, it is not preferred to continuously change the selected 0.D.-V ROM table in accordance with the temperature change as described above because a discontinuous area is formed on the image.

This drawback is eliminated as follows.

(a) A command for normally setting an A/D enable signal in an inhibited state and enabling the signal immediately before data of one image is sent is supplied to the printer, temperature detection of the printer is performed for a temperature at this time, and an optimal correction curve is selected.

(b) When a command which can be apparently recognized to be an end of one image is supplied, the printer independently performs temperature change.

Example of the command which can be apparently recognized to be an end of an image are as follows although they depend on functions of the printer.

(1) When a print start command is sent.

(2) When an FF (page change) code is sent.

(3) When an LF (line feed) code is continuously sent twice.

(4) In a printer in which a print start position can be changed, when the position is changed.

(5) In a printer in which a print size can be changed, when the size is changed.

(6) In a printer having an enlarged scale print function, when an enlargement magnifying power is changed.

(7) In a printer in which a harmonization correction curve with respect to input data can be changed, when the curve is changed.

Figure 3:
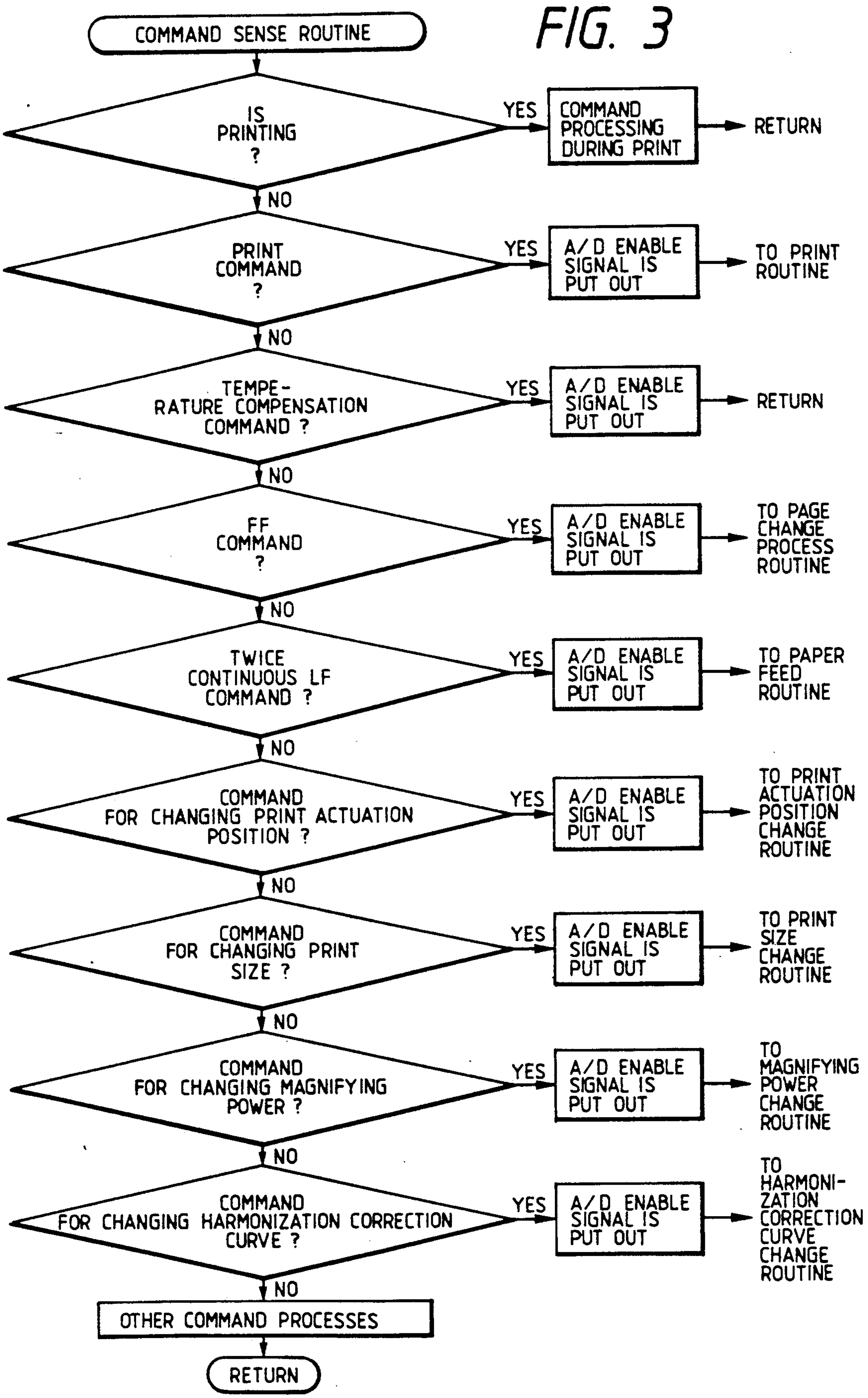
FIG. 3 is a flow chart for explaining a control program in a CPU 22.

FIG. 3 is a control flow chart of the CPU 22 for executing the above operation. The control program shown in FIG. 3 is stored in the ROM 26.

FIG. 3 shows a command sense routine. As shown in FIG. 3, not during print of one image, but in the states of (1) to (7) described above or when a temperature compensation command is supplied from an external equipment, an A/D enable signal is put out, and a temperature compensation table may be changed.

Alternatively, the data transmitting side (external equipment side) may have a command for inhibiting a temperature change of the printer itself, thereby inhibiting the above function. A reference for checking the end of an image is not limited to the above method. Even when setting of the temperature compensation curve is continuous, a change of the curve during print of one image can be inhibited. When the temperature changes stepwise twice or more, the curve can be changed. It is a matter of course that when cut paper is used, the end of one image can be detected and no problem is posed.

In the above embodiment, a thermocouple is used as a temperature sensor. However, another sensor such as a thermistor can be used. In addition, the table ROM is used as a temperature adjusting means. However, the temperature adjustment can be made by changing an amplification ratio of the amplifier. The recording means is not limited to the ink jet head but may be a thermal head (in which a plurality of heat-generating elements are selectively operated to generate heat in accordance with image information to record an image on a recording medium) or the like. The recording medium includes normal paper, converted paper, thermal paper, and the like. The present invention can be applied to not only a continuous sheet but also a cut sheet as a recording medium. When the present invention is applied to a cut sheet, the image density can be maintained constant throughout an entire recording area of the cut sheet. In the present invention, image information need not be supplied from an external equipment. For example, an image information input means may be arranged integrally with the printer.

As has been described above, according to the embodiment of the present invention, a temperature compensation curve is not changed until print of one image is completed, thereby eliminating discontinuity of the image. Although hue and density are changed by a temperature change, these changes are not significant to require a change of the curve. As a result, a good image can be obtained as a whole.

As described above, according to the present invention, there is provided a printer capable of forming a recording image with a uniform density.

I claim:

1. A printer for recording plural images on a recording medium, comprising:

recording means for recording at least one of said plural images on said recording medium;

temperature detecting means for detecting a temperature;

control means for controlling energy to be applied to said recording means in accordance with a detection result of said temperature detecting means;

memory means for storing a plurality of predetermined commands for the printer, each command indicating that a boundary of said at least one image has been reached;

recognizing means for recognizing the boundary of said image in response to each and every one of the plurality of predetermined commands; and operating means for operating said control means in accordance with the boundary of said image recognized by said recognizing means.

2. A printer according to claim 1, wherein said temperature detecting means is provided in said recording means.

3. A printer according to claim 1, wherein a detection temperature of said temperature detecting means is an environmental temperature.

4. A printer according to claim 1, wherein said detection temperature of said temperature detecting means is a temperature of said recording means.

5. A printer according to claim 1, wherein said recording means includes an ink jet head for ejecting an ink liquid to record said image on said recording medium.

6. A printer according to claim 1, wherein said recording means includes a thermal head in which a plurality of heat-generating elements are selectively operated to generate heat to record said image on said recording medium.

7. A printer according to claim 1, wherein said control means includes a plurality of temperature compensation tables.

8. A printer according to claim 1, wherein a boundary of said image is recognized when a print start command is sent.

9. A printer according to claim 1, wherein a boundary of said image is recognized when a page change code is sent.

10. A printer according to claim 1, wherein a boundary of said image is recognized when a line feed code is continuously supplied twice or more.

11. A printer according to claim 1, wherein a boundary of said image is recognized when a print start position is changed in said printer in which the print start position can be changed.

12. A printer according to claim 1, wherein a boundary of said image is recognized when a print size is changed in a printer in which the paint size can be changed.

13. A printer according to claim 1, wherein a boundary of said image is recognized when enlargement magnifying power is changed in said printer having an enlarged scale print function.

14. A printer according to claim 1, wherein a boundary of said image is recognized when a harmonization correction curve with respect to input data is changed in a printer in which the harmonization correction curve can be changed.

15. A printer according to claim 1, wherein said recording means records said image on the recording medium using a plurality of colors.

16. A continuous paper printer which operates in accordance with a command from an external equipment to record plural images, comprising:

- temperature detecting means for detecting a temperature;
- adjusting means for adjusting a print density in accordance with a detection output from said temperature detecting means;
- memory means for storing a plurality of predetermined commands for the printer, each command indicating that a boundary of a single image of said plural images has been reached;
- recognizing means for recognizing the boundary of said image in response to each and every one of the plurality of predetermined commands; and
- control means for operating said adjusting means in accordance with an output from said recognizing means.

17. A printer according to claim 16, wherein a detection temperature of said temperature detecting means is an environment temperature.

18. A printer according to claim 16, wherein said detection temperature of said temperature detecting means is a temperature of said recording means.

19. A printer according to claim 16, wherein said adjusting means includes a plurality of temperature compensation tables.

20. A printer according to claim 16, wherein a boundary of said image is recognized when a print start command is sent.

21. A printer according to claim 16, wherein a boundary of said image is recognized when a page change code is sent.

22. A printer according to claim 16, wherein a boundary of said image is recognized when a line feed code is continuously supplied twice or more.

23. A printer according to claim 16, wherein a boundary of said image is recognized when a print start position is changed in said printer in which the print start position can be changed.

24. A printer according to claim 16, wherein a boundary of said image is recognized when a print size is changed in said printer in which the print size can be changed.

25. A printer according to claim 16, wherein a boundary of said image is recognized when enlargement magnifying power is changed in said printer having an enlarged scale print function.

26. A printer according to claim 16, wherein a boundary of said image is recognized when a harmonization correction curve with respect to input data is changed in said printer in which the harmonization correction curve can be changed.

27. A printer according to claim 16, wherein said printer is a color printer.

28. A printer for recording plural images on a recording medium, comprising:

- recording means for recording at least one of said plural images on a recording medium;
- temperature detecting means for detecting a temperature;
- memory means for storing a plurality of predetermined commands for the printer, each command indicating that a boundary of a single image of said plural images has been reached;
- recognizing means for recognizing the boundary of said image in response to each and every one of the plurality of predetermined commands; and
- control means for controlling energy to be applied to said recording means in accordance with a detection result of said temperature detecting means and a recognition result of said recognizing means.

29. A printer according to claim 28, wherein said temperature detecting means is provided in said recording means.

30. A printer according to claim 28, wherein a detection temperature of said temperature detecting means is an environment temperature.

31. A printer according to claim 28, wherein said detection temperature of said temperature detecting means is a temperature of said recording means.

32. A printer according to claim 28, wherein said recording means includes an ink jet head for ejecting an ink liquid to record said image on said recording medium.

33. A printer according to claim 28, wherein said recording means includes a thermal head in which a plurality of heat-generating elements are selectively operated to generate heat to record said image on said recording medium.

34. A printer according to claim 28, wherein said control means includes a plurality of temperature compensation tables.

35. A printer according to claim 28, wherein a boundary of said image is recognized when a print start command is sent.

36. A printer according to claim 28, wherein a boundary of said image is recognized when a page change code is sent.

37. A printer according to claim 28, wherein the boundary of an image is recognized when a line feed code is continuously supplied twice or more.

38. A printer according to claim 28, wherein a boundary of said image is recognized when a print start position is changed in said printer in which the print start position can be changed.

39. A printer according to claim 28, wherein a boundary of said image is recognized when a print size is changed in said printer in which the print size can be changed.

40. A printer according to claim 28, wherein a boundary of said image is recognized when enlargement magnifying power is changed said a printer having an enlarged scale print function.

41. A printer according to claim 28, wherein a boundary of said image is recognized when a harmonization correction curve with respect to input data is changed in said printer in which the harmonization correction curve can be changed.

42. A printer according to claim 28, wherein said recording means records said image on the recording medium using a plurality of colors.

* * * * *

UNITED STATES PATENT AND TRADEMARK OFFICE

CERTIFICATE OF CORRECTION

PATENT NO. : 5,023,626

DATED : June 11, 1991

INVENTOR(S) : HIDEAKI KAWAMURA

It is certified that error appears in the above-identified patent and that said Letters Patent is hereby corrected as shown below:

IN [57] ABSTRACT

Line 6, "recognizing circuit for a" should read --a recognizing circuit for--.

COLUMN 1

Line 22, "recording" should read --recording,--.

COLUMN 2

Line 1, "computer" should read --computer)--.

COLUMN 3

Line 28, "Example" should read --Examples--.

COLUMN 5

Line 19, "a" should read --said-- and "paint" should read --print--.

Line 28, "a" should read --said--.

UNITED STATES PATENT AND TRADEMARK OFFICE
CERTIFICATE OF CORRECTION

PATENT NO. : 5,023,626

DATED : June 11, 1991

INVENTOR(S) : HIDEAKI KAWAMURA

It is certified that error appears in the above-identified patent and that said Letters Patent is hereby corrected as shown below:

COLUMN 6:

Line 64, "the" should read -- a --.
Line 65, "an" should read -- said --.

COLUMN 8:

Line 1, "said a printer" should read --in said printer--.

Signed and Sealed this

Second Day of March, 1993

Attest:

STEPHEN G. KUNIN

*Attesting Officer*

*Acting Commissioner of Patents and Trademarks*